(12) United States Patent
Brett et al.

(10) Patent No.: US 6,950,146 B1
(45) Date of Patent: Sep. 27, 2005

(54) METHOD AND CIRCUIT FOR INSERTING A PICTURE INTO A VIDEO PICTURE

(75) Inventors: Maik Brett, Munich (DE); Dirk Wendel, Unterhaching (DE); Matthias Burkert, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/979,079

(22) PCT Filed: May 19, 2000

(86) PCT No.: PCT/DE00/01616

§ 371 (c)(1),
(2), (4) Date: Mar. 13, 2002

(87) PCT Pub. No.: WO00/72587

PCT Pub. Date: Nov. 30, 2000

(30) Foreign Application Priority Data

May 21, 1999 (DE) .............................. 199 23 519

(51) Int. Cl.$^7$ ............................................. H04N 5/46
(52) U.S. Cl. ...................... 348/556; 348/565; 348/558
(58) Field of Search ............................... 348/556, 558, 348/565–568, 445, 913

(56) References Cited

U.S. PATENT DOCUMENTS

| 5,365,276 A | 11/1994 | Imai et al. .................. 348/556 |
| 5,404,177 A | 4/1995 | Imai et al. .................. 348/588 |
| 5,455,632 A * | 10/1995 | Ichihara ....................... 348/565 |
| 5,471,249 A | 11/1995 | Monta et al. ................ 348/445 |
| 5,486,871 A | 1/1996 | Filliman et al. ............. 348/558 |
| 6,310,656 B1 * | 10/2001 | Miyazaki et al. ........... 348/568 |
| 6,452,638 B1 * | 9/2002 | Oku et al. ................... 348/441 |

FOREIGN PATENT DOCUMENTS

| DE | 41 37 210 C2 | 5/1992 |
| DE | 42 19 307 A1 | 12/1992 |
| DE | 195 34 781 C1 | 1/1997 |
| EP | 0 573 280 A2 | 12/1993 |
| EP | 0 766 463 A2 | 4/1997 |
| EP | 0 913 993 A1 | 5/1999 |

* cited by examiner

*Primary Examiner*—Victor R. Kostak
(74) *Attorney, Agent, or Firm*—Fitzpatrick, Cella, Harper & Scinto

(57) ABSTRACT

In display apparatuses, particularly television receivers and monitors, a video picture can be inserted into a main picture (HB) from a first video signal (VS1), in which a second picture (ZB) from a second video signal (VS2) has a first picture format and is composed of picture lines (BZ) and filling lines (FZ). The picture lines (BZ) forming a sub-picture (UB) with the second picture format is adjoined by the filling lines (FZ) in the vertical picture direction. The second picture format of the sub-picture (UB) is determined and the determined second picture format is used for determining the filling lines (FZ). The picture lines (BZ) and a portion of the filling lines (FZ) are inserted as an insertion picture into the main picture (HB). Additional insertions (OSD) from an additional signal, which at least partly lie within the filling lines (FZ), is displaced into the sub-picture (UB).

10 Claims, 2 Drawing Sheets

Legend:
HB  Main Picture
OSD Additional Insertion
UB  Sub-Picture
ZB  Second Picture
FS1 First Picture Format Signal
FS2 Second Picture Format Signal Legend:
HB   Main Picture
OSD  Additional Insertion
UB   Sub-Picture
ZB   Second Picture
FS1  First Picture Format Signal
FS2  Second Picture Format Signal Legend:
1. Main Processing Unit
2. Second Processing Unit
3. Changeover Device
4. Picture Display Control Unit
5. Picture Display Device
6. Separation Device
7. Detection Circuit
8. Input Device
9. Common Signal Processing Unit
10. Picture Decimation Circuit

METHOD AND CIRCUIT FOR INSERTING A PICTURE INTO A VIDEO PICTURE

This application has been filed under 35 U.S.C. § 371. Applicants hereby claim priority under the international Convention and all rights to which they are entitled under 35 U.S.C. § 119 based upon International Application No. PCT/DE00/01616, filed May 19, 2000, published in German as International Publication No. WO 00/72587 A1, and based upon German Application No. DE 199 23 519.8, filed May 21, 1999.

BACKGROUND OF THE INVENTION

1. Field of the Invention

The invention relates to a method for inserting an insertion picture into a video picture, such as a television picture for example. The invention furthermore relates to a circuit arrangement which can be used to carry out a method for video picture insertion. In the case of video picture insertion, a further picture is displayed within the actual video picture. The signal for such an insertion picture can originate from a receiving unit in a television receiver, a video camera, a video recorder, a computer or another video signal source.

2. Description of the Related Art

In television receivers, this function, which is also referred to as picture-in-picture insertion (picture-in-picture, PiP), allows a further broadcast to be followed, in addition to the broadcast of a set program, via an excerpt from the television screen. The size of the excerpt and its position within the screen are often adjustable. The relative size of the excerpt in relation to the size of the visible screen determines how much of the picture content of the actual video picture is concealed by the insertion picture.

Circuit arrangements for video picture insertions contain, in addition to the input for the video signal, an additional input for the signal of the insertion picture. A changeover switch is used to change over between these signals in such a way that, in the case of a specific line and in the case of a specific line section, the matching signal is fed to the screen or another display device and the displayed picture is composed of the video picture with the insertion picture. Such a circuit arrangement is disclosed for example in DE 195 34 781 C1.

Video pictures can have different picture formats. The 4:3 format is used throughout the world for television pictures. The format detail stipulates that the ratio of the horizontal length to the vertical width is 4:3. The television corporations usually broadcast their programs in this 4:3 picture format. Another customary format is the 16:9 format, in which the aspect ratio is closer to that of cinema films.

Broadcasts having the 16:9 format are also transmitted in the 4:3 format. Customary television receivers receive these broadcasts in the same way as 4:3 broadcasts. Black bars at the top and bottom edges of the picture or else wide bars only at the bottom edge of the picture or only at the top edge of the picture then fill those regions of the television picture in the 4:3 format which are not utilized in the case of correctly-formatted reproduction of 16:9 broadcasts.

The windows for the insertion pictures in picture-in-picture applications also approximately have the 4:3 picture format. If an insertion picture which is likewise present in the 4:3 format is inserted into the actual video picture, then the insertion picture, after a decimation which maintains the aspect ratio, can be represented in a format-filling manner in the window without the insertion picture having to be compressed or stretched in a picture direction. The format of the screen is unimportant here.

If a broadcast in the 16:9 format is represented in the insertion picture, then black bars appear at the top and bottom edges of the insertion picture in the window, for the reasons mentioned above. These bars are disturbing to a viewer of the screen, particularly as they crop up in the actual video picture. The bars cover regions of the actual video picture with a picture content of the insertion picture which generally contains no information of interest to the viewer.

SUMMARY OF THE INVENTION

It is an object of the present invention to improve the picture impression in the event of video picture insertions of picture contents with an arbitrary picture format into a window with a predetermined picture format.

This object is achieved by means of a method having the features of claim 1. Moreover, the object is achieved by means of a circuit arrangement having the features of claim 8.

The invention has the advantage that the picture impression of the entire picture represented on a screen is improved. Regions having no contents of interest to a viewer do not occur, or occur only to a reduced extent, on the screen.

It may be expedient not to suppress all of the filling lines but rather, for example, only those which are situated at the bottom edge of the insertion picture. The top black bar can be used for additional information about the insertion picture, such as, for example, a detail about the source of the video signal for the insertion picture ("camera 1", "camera 2", . . . ). It goes without saying that the bottom black bar can also be used for this purpose.

If the second picture has only one black (wide) bar, it may be expedient to suppress only a portion of the filling lines in order, for example, to obtain insertions within the bar.

It may also prove to be expedient for additional insertions from an additional signal, which is supplied for example by a character generator, as is customary in teletext decoders and is also used for screen menus, to be displaced into the sub-picture. Such an additional insertion may be e.g. a symbol for a two-channel sound or the name of a television corporation. If this symbol is situated within those regions of the second picture which do not belong to the insertion picture, then this information is not displayed on the screen. By appropriate driving of the character generator, the symbol is inserted within the picture lines of the second picture. The symbol is thus represented even though the filling lines do not appear in the main picture.

In a preferred embodiment, the picture format of the sub-picture is determined and used to determine the filling lines. If the size and the picture format of the second picture and also the picture format of the sub-picture are known, the number of filling lines is unambiguously defined in the case of a specific format of the screen of the television receiver.

The picture format of the sub-picture can be derived from the format information which is transmitted with the second video signal for the broadcast. The format information describes the picture format of the broadcast.

Finally, it is possible for an input device to be provided, by means of which a picture format can be preselected. In the simplest case, for example, there is a key on the remote control for a television receiver, which key can be used to change over between the 4:3 and the 16:9 format.

Finally, it may be expedient to compress or stretch the second picture. In the vertical direction, compression is obtained by using only every n-th line, and stretching is obtained by adding further lines to the existing lines by interpolation. In the horizontal picture direction, compression is obtained by using only every n-th pixel of each line, and stretching is obtained by adding further pixels between existing pixels.

Further advantageous designs and developments are characterized in subclaims.

BRIEF DESCRIPTION OF THE DRAWINGS

The invention is explained in more detail below with reference to figures. Corresponding elements are provided with identical reference symbols. In the figures.

DETAILED DESCRIPTION

In accordance with the exemplary illustration according to FIG. 1, a second picture ZB is inserted into a main picture HB. The main picture HB is transmitted by a first video signal VS1, and the second picture ZB is transmitted by a second video signal VS2. The two signals may originate from the same or from different video signal sources. The second picture ZB can assume any desired position within the main picture HB. By way of example, it is assumed that the second picture ZB is transmitted in a 4:3 picture format. This means that it has four length units in the horizontal picture direction and three length units in the vertical picture direction. In the second picture ZB, a sub-picture UB is represented which has a picture format that is different from the picture format of the second picture. In this example, it shall be assumed that the sub-picture UB has the 16:9 picture format. This format is also known under the designation wide-screen format. Since the sub-picture UB is completely contained in the second picture ZB, its area is less than that of the second picture ZB.

Figure 1A:
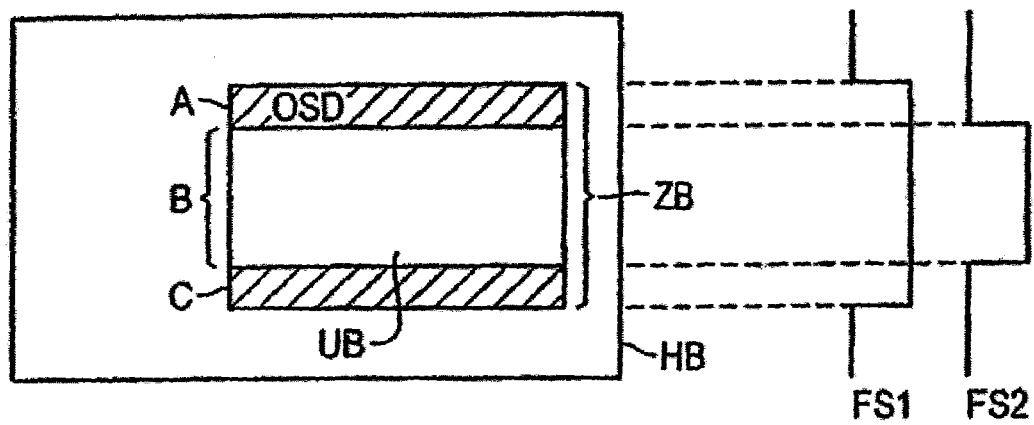
FIG. 1 shows a diagrammatic illustration of picture insertion.

The second picture ZB is composed of lines, as is customary in video pictures. The lines which form the sub-picture UB are designated as picture lines BZ hereinafter. They contain the actual picture information which is transmitted with the second picture ZB. The area of the second picture ZB which is not filled by the picture lines BZ of the sub-picture UB is constituted by filling lines FZ. In the case of television broadcasts, the second picture ZB is usually transmitted in such a way that the sub-picture UB is arranged centrally within the second picture ZB with regard to the vertical picture direction. The filling lines FZ adjoin the top and bottom of the sub-picture UB in the vertical picture direction. The filling lines FZ are generally keyed black, so that the sub-picture UB with a top black bar A and a bottom black bar C appears in addition to the main picture HB on a screen. In FIG. 1A, that region of the second picture which is occupied by the picture lines BZ of the sub-picture UB is designated as region B.

According to the invention, it is provided that not all the lines of the second picture ZB, rather only the picture lines BZ and at most a portion of the filling lines FZ are inserted into the main picture HB. The main picture HB is thus covered only by the picture lines BZ of the sub-picture UB and at most a portion of the filling lines FZ. This includes the case where a few picture lines BZ are not taken into account during the insertion, e.g. if, owing to inaccuracies, during a determination of the filling lines, picture lines are also interpreted as filling lines, or in the case of a format adaptation of the sub-picture by omitting picture lines at the edge of the picture.

Filling lines occur when the ratio of the picture format of the sub-picture UB is greater than the ratio of the picture format of the second picture ZB. In this sense, the 16:9 picture format is larger than the 4:3 picture format, which corresponds to the 12:9 picture format. In the illustration according to FIG. 1B, the regions of the filling lines FZ are illustrated by broken lines.

Figure 1B:
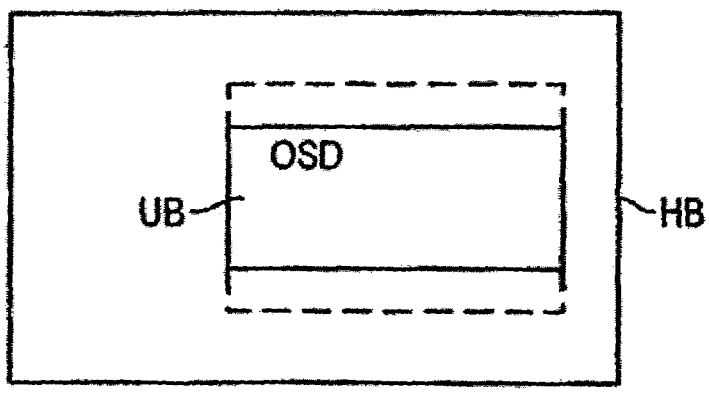

In FIG. 1, an additional insertion OSD is present in the top bar A. Said additional insertion is generated at the receiver end and originates from a character generator, for example. These additional insertions are generally inserted at a specific position at the top edge of the second picture ZB. They are often symbols which signal the reception of two-channel sound or information about specific parameters. If the filling lines FZ are not inserted, then the additional insertion is not displayed either. As an exemplary embodiment, therefore, it is provided that the additional insertion OSD is displaced in such a way that it is inset within the sub-picture UB. FIG. 1B shows such a possible position for the additional insertion OSD.

In order to suppress the insertion of all the filling lines or of the portion of the filling lines FZ, these must first be determined. The filling lines FZ can be determined directly from the video signal for the second picture ZB or be derived from the picture format of the sub-picture UB, which must be determined beforehand.

The filling lines FZ can be detected by evaluating a luminance component in the video signal for the second picture ZB, whose level determines the brightness value of each pixel of the second picture. This is because said filling lines are transmitted as continuous black lines within the second picture ZB. In the case of a customary broadcast, it is highly likely that, in the case of a plurality of sub-pictures, the regions A and C will have a different brightness value than the region B. The luminance component is checked by a threshold circuit, for example. If said luminance component reaches a luminance component which lies above a defined threshold for a defined number of continuous lines which are situated within a certain distance at the top and bottom edges of the second picture, then it is assumed that these lines are filling lines FZ. In this case, it is assumed that black lines have a high value of the luminance component and brighter lines have a lower value. Only when picture lines BZ are detected is a specific level of a picture format signal FS set. Only when this level is in turn present are lines of the second picture ZB inserted into the main picture HB. FIG. 1 illustrates a first picture format signal FS 1. It controls the insertion of the complete second picture ZB. A second picture format signal FS2, shown in FIG. 1B, causes only the insertion of the picture lines of the sub-picture UB.

If the size of the second picture ZB and its picture format are known, then the filling lines FZ can be determined with the aid of the picture format of the sub-picture UB. The area produced by the regions A and C is then unambiguously defined geometrically. If the sub-picture UB is situated exactly in the middle of the second picture ZB, the position of the bars A and C is also unambiguous.

In some instances, a format information item is transmitted during broadcasts with the television signal, said format information item specifying the format in which the broadcast is present. This format information item is evaluated by a suitable circuit in order thus to obtain knowledge of the picture format of the sub-picture UB.

Another possibility for determining the picture format of the sub-picture UB is to define the regions A, B and C in the second picture ZB by examining the luminance level of the video signal, as has already been explained further above. These methods are known by the designation letterbox detection. Such a method is described in detail, e.g. in U.S. Pat. No. 5,486,871.

Furthermore, it may be provided that the picture format of the sub-picture UB is input by a television viewer using a control means. The television viewer takes the picture format from a television guide, for example, and chooses the desired picture format from predetermined picture formats using a remote control. Finally, he can also change over between different picture formats by way of trying them out and finally retain the one with which he receives the best picture impression of the insertion picture.

A frame possibly provided around the second picture ZB must, of course, be adapted if not all or even none of the filling lines are inserted, so that the frame only encloses those lines of the second picture which can be seen in the main picture HB.

The method is suitable in particular in the context of inserting a plurality of insertion pictures. If only the sub-picture UB is in each case inserted into the main picture, then less space is required for each individual picture. More sub-pictures can then be inserted on a specific area of the main picture.

Figure 2A:
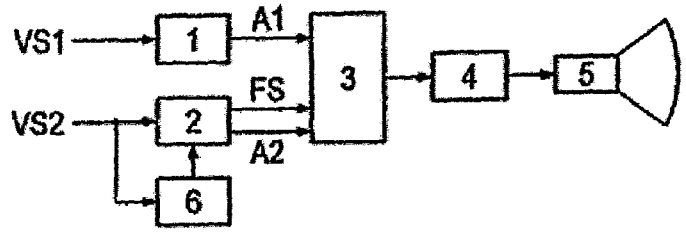
FIG. 2 shows circuit arrangements according to the invention for picture insertion.

In accordance with FIG. 2A, a first circuit according to the invention contains a main processing unit 1, to which the first video signal VS1 is fed, and a second processing unit 2, to which the second video signal VS2 is fed. The processing units 1 and 2 are connected to inputs of a changeover device 3, which is connected to a picture display control unit 4 on the output side. Said unit generates a picture control signal which can drive a picture display device 5, e.g. a cathode ray tube or a TFT screen, for representing the main picture and the insertion picture.

The second video signal is additionally fed to a separation device 6, whose output is connected to an input of the second processing unit 2.

The main processing unit 1 processes the first video signal VS1 and provides a main picture signal A1, which contains the information for constructing the lines of the main picture HB. The first video signal is, for example, a television signal (CVBS). The demodulation and color decoding of the first video signal VS1 are then effected in the main processing unit 1. The first video signal may, for example, also originate from a computer or another video signal source. The main processing unit 1 may then be obviated, under certain circumstances.

The second processing unit 2 may be constructed like the main processing unit 1. It additionally contains a decimation circuit which reduces the dimensions of a picture transmitted via the second video signal, e.g. by subsampling. The separation device 6 obtains an item of information about the picture format of the second picture from the second video signal. This item of information is transferred to the second processing unit 2, which uses this information to generate the picture format signal FS. The main picture signal A1, the signal for the second picture A2 and the picture format signal FS are transferred to the changeover device 3. The changeover device 3 changes over between these signals in such a way that the main picture HB with the insertion picture appears on the picture display device 5. In this case, the picture format signal FS decides whether the entire second picture ZB or only the sub-picture UB and a portion of the filling lines FZ or only the sub-picture UB is inserted into the main picture HB. The lines of the second picture ZB which are currently present for display are also inserted only when the picture format signal FS has a specific level. When the picture format signal FS has a second level, the insertion of these lines is suppressed. The second processing unit 2 supplies the picture format signal FS with the corresponding levels, since only the corresponding lines of the second picture ZB are displayed in a manner dependent on the determined picture format of the sub-picture UB.

Figure 2B:
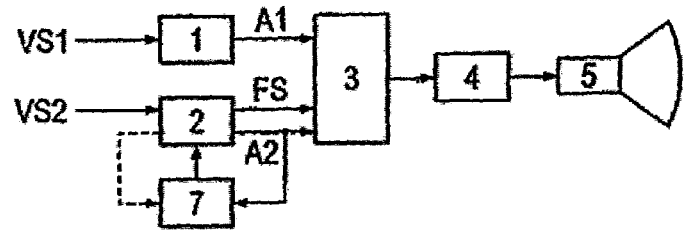

In an exemplary embodiment according to FIG. 2B, the main processing unit 1, the second processing unit 2, the changeover device 3, the picture display control unit 4 and the picture display device 5 are connected up as in the exemplary embodiment according to FIG. 2A. However, in this case the separating device 6 is replaced by the detection circuit 7, to which is fed the decimated signal for the second picture A2 (signal path 20 in FIG. 2B). As an alternative, it can also be fed the signal for the second picture A2 before it is subjected to the decimation (signal path 21, illustrated by broken lines).

The detection circuit 7 determines the picture format of the sub-picture UB according to the principle of automatic letterbox detection described further above.

From the lines of the second picture, it determines the information about the picture format of the sub-picture UB. This information is forwarded to the second processing unit 2, which generates the picture format signal FS.

This exemplary embodiment is preferably to be used when no information about the picture format of the sub-picture UB is transmitted with the television signal. It is suitable in particular when the filling lines FZ in the upper region A and in the lower region B of the second picture ZB are of different sizes. Any desired format is identified through corresponding programming of the detection circuit 7 as long as the differences between the pictures lines BZ and the filling lines FZ are large enough that a threshold circuit can be used to distinguish between them. Signal processing can be used to achieve detection even in the case of slight differences between the filling lines FZ and the picture lines BZ.

Figure 2C:
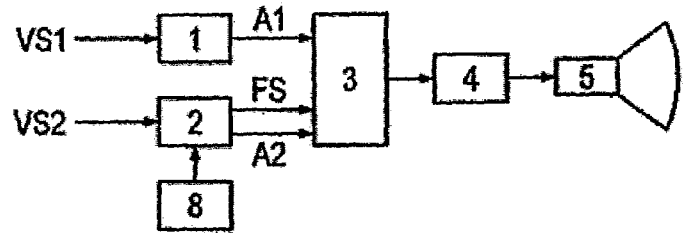

A further exemplary embodiment according to FIG. 2C corresponds in respect of the blocks 1, 2, 3, 4 and 5 to those of the first exemplary embodiment according to FIG. 2A. In this case the separation device 6 is replaced by an input device 8 connected to the main processing unit 1. The input device 8 serves for directly inputting the picture format of the sub-picture UB. For this purpose, using a remote control, for example, a television viewer selects from a plurality of possible picture formats the one which he recognizes as sub-picture UB on the picture display device 5. It is also conceivable for him to input all the predetermined picture formats and decide on the one with which he believes he has the best picture impression. In the simplest case, it is possible to choose between two different picture formats using the input device 8. Thus, by way of example, when a television receiver containing the circuit arrangement is switched on, 4:3 is preset as picture format for the sub-picture UB. Through actuation of a corresponding key on the remote control or directly on the television receiver, a changeover is made to the 16:9 picture format for the sub-picture UB.

In the case of the above-described exemplary embodiments for the circuit arrangements, signals which can be directly processed by the picture display control unit 4 are present at the inputs of the changeover device 3. The signals are the signal for the lines of the main picture HB and the signal for the picture lines and the filling lines of the second picture ZB.

Figure 2D:
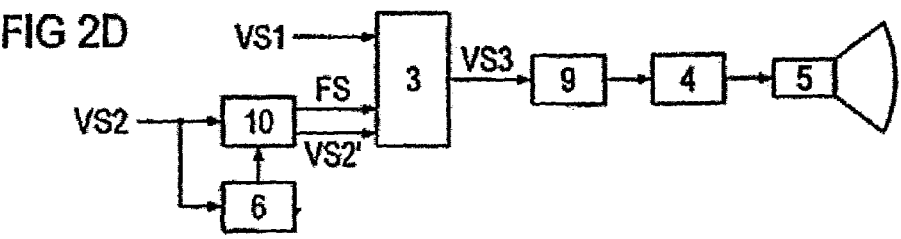

In an exemplary embodiment according to FIG. 2D, the changeover device 3 changes over directly between the first video signal VS1 and an insertion video signal VS2', which is derived from the second video signal VS2 by decoding, decimation and coding in a picture decimation circuit 10. The video signals VS1 and VS2 are, for example, in each case a CVBS signal (color, video, blanking, syncs signal) or a Y/C signal (luminance/chrominance signal). The insertion video signal VS2', which is synchronous with the first video signal VS1, transmits a second picture of reduced size. The picture decimation circuit 10 generates the picture format signal FS.

In contrast to the circuit arrangements described above in the exemplary embodiments, the demodulation and decoding are effected downstream of the changeover device 3, rather than upstream. On the input side, a common signal processing unit 9 is connected to the output of the changeover device 3. It is fed a third video signal VS3 which is formed in the changeover device 3 by combination of the first video signal VS1 with the insertion video signal VS2'.

The signal for the lines of the main picture and the signal for the picture lines and the filling lines of the second picture are present at the output of the signal processing unit 9. The picture display control unit 4 and the picture display device 5 correspond to those of the previous exemplary embodiments.

Rather than being connected to the second processing unit 2, the separation device 6 is connected to the picture decimation circuit 10 in accordance with the exemplary embodiment according to FIG. 2A. The basic method of operation is the same.

Embodiments with use of the detection circuit 7 or with use of the input device 8 operate here in accordance with the exemplary embodiments according to FIG. 2B or FIG. 2C.

It is emphasized that the invention is not restricted to 4:3 or 16:9 picture formats, but rather is suitable for any desired picture formats.

The first and the second video signal VS1, VS2 may also be RGB or YUV signals. They may also be present in the form of a digital data stream, e.g. according to the MPEG standard.

What is claimed is:

1. A method for inserting an insertion picture into a main picture from a first video signal, in which a second picture from a second video signal has a first picture format and is composed of picture lines and filling lines, the picture lines forming a sub-picture with a second picture format which is adjoined by the filling lines in a vertical picture direction, said method comprising the step of:
   determining the second picture format of the sub-picture;
   determining the filling lines; and
   inserting the picture lines and at most a portion of the filling lines as the insertion picture into the main picture,
   wherein the determined second picture format of the sub-picture is used for determining the filling lines, and
   wherein additional insertions from an additional signal, which at least partly lie within the filling lines, are displaced into the sub-picture.

2. A method according to claim 1, wherein the filling lines adjoin a top and bottom of the sub-picture and only picture lines and upper filling lines or only the picture lines and the lower filling lines are inserted.

3. A method according to claim 1 or 2, wherein the filling lines are determined from a size of the second picture, the first picture format and the second picture format.

4. A method according to claim 3, wherein the second picture format is determined from a format information item contained in the second video signal or from a picture content of the second picture by means of picture processing.

5. A method according to claim 3, wherein details about a possible second picture format are preselected by means of an input device.

6. A method according to claim 1, wherein the second picture format of the sub-picture is changed in at least one of a horizontal and a vertical picture direction to form a third format, different from the second picture format.

7. A circuit arrangement for inserting an insertion picture into a main picture from a first video signal, said circuit arrangement comprising:
   a main processing unit, to which the first video signal can be provided and which can generate a signal for lines of the main picture;
   a second processing unit, to which a second video signal can be provided and which can generate a signal for picture lines and filling lines of a second picture, which has a first picture format and is suitable for insertion into the main picture, the picture lines forming a sub-picture with a second picture format which is adjoined by the filling lines in a vertical picture direction;
   a format identification circuit for determining the second picture format of the sub-picture and for generating a picture format signal, which includes an item of information about the picture format of the sub-picture, an output of said format identification circuit being connected to the second processing unit;
   a changeover device, having at least one input connected to outputs of said main processing unit and said second processing unit, said changeover device providing either the signal for the lines of the main picture or the signal for the picture lines and at most a portion of the filling lines of the second picture, the portion being determined by the picture format signal; and
   a picture display drive unit, connected to an output of said changeover device, and generating a picture drive signal which can drive a picture display device for representing the main picture and the insertion picture,
   wherein said changeover device provides the signal for the picture lines at its output such that additional insertions from an additional signal, which at least partly lie within the filling lines, are displaced into the sub-picture.

8. A circuit arrangement according to claim 7, wherein said format identification circuit includes a separation device for separating data with information about the second picture format from the second video signal.

9. A circuit arrangement according to claim 7, wherein said format identification circuit determines a number of filling lines as information about the second picture format.

10. A circuit arrangement according to claim 7, wherein said format identification circuit contains an input device for inputting the information about the second picture format.

* * * * *